United States Patent
Holmgren et al.

(10) Patent No.: US 7,815,012 B2
(45) Date of Patent: Oct. 19, 2010

(54) NOISE OPTIMIZED AIR DISTRIBUTOR

(75) Inventors: Joakim Holmgren, Hamburg (DE); Jens Vasel, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 12/253,023

(22) Filed: Oct. 16, 2008

(65) Prior Publication Data

US 2009/0032330 A1 Feb. 5, 2009

Related U.S. Application Data

(63) Continuation of application No. PCT/EP2007/003191, filed on Apr. 10, 2007.

(60) Provisional application No. 60/745,202, filed on Apr. 20, 2006.

(30) Foreign Application Priority Data

Apr. 20, 2006 (DE) .................. 10 2006 018 404

(51) Int. Cl.
*E04F 17/04* (2006.01)
*F24F 13/08* (2006.01)

(52) U.S. Cl. ................. 181/224; 181/225; 181/264; 454/309

(58) Field of Classification Search ............ 181/210, 181/213, 218, 224, 225, 264, 267; 138/177; 454/108, 152, 245, 262, 284, 309
See application file for complete search history.

(56) References Cited

U.S. PATENT DOCUMENTS

| | | | | |
|---|---|---|---|---|
| 2,280,953 A * | 4/1942 | Huntoon | ..................... | 181/240 |
| 2,890,717 A * | 6/1959 | Werder | ....................... | 137/521 |
| 2,990,906 A * | 7/1961 | Audette | ....................... | 181/256 |
| 3,568,791 A | 3/1971 | Luxton | | |
| 3,712,412 A * | 1/1973 | Hassett et al. | .............. | 181/206 |
| 3,750,839 A * | 8/1973 | McNabney | ................. | 181/224 |
| 4,133,479 A * | 1/1979 | Musitano et al. | ....... | 237/12.3 A |
| 4,142,606 A * | 3/1979 | Vanderzanden et al. | ..... | 181/231 |
| 4,180,141 A * | 12/1979 | Judd | ......................... | 181/264 |
| 4,266,602 A * | 5/1981 | White et al. | ............... | 165/124 |
| 4,537,278 A * | 8/1985 | Okada et al. | ............... | 181/227 |
| 5,123,501 A * | 6/1992 | Rothman et al. | ........... | 181/239 |
| 5,936,210 A * | 8/1999 | Borneby et al. | ............ | 181/264 |
| 6,024,639 A * | 2/2000 | Scherer et al. | ............... | 454/77 |
| 6,152,258 A * | 11/2000 | Deavers et al. | ............. | 181/282 |
| 6,161,646 A * | 12/2000 | Curl | ........................... | 181/252 |
| 6,374,944 B1 * | 4/2002 | Curl, Jr. | ...................... | 181/282 |
| 6,640,926 B2 * | 11/2003 | Weinstein | ................... | 181/224 |

(Continued)

FOREIGN PATENT DOCUMENTS

AU 753367 B2 10/2002

(Continued)

*Primary Examiner*—Jeffrey Donels
*Assistant Examiner*—Jeremy Luks
(74) *Attorney, Agent, or Firm*—Ingrassia Fisher & Lorenz, P.C.

(57) ABSTRACT

An air distributor is provided that includes, but is not limited to a perforated body, insertable at a joint between a first air duct, which extends in one direction, and a second air duct, that extends in a second different direction, to redirect air flowing in the first air duct into the second air duct and to reduce low frequency high volume noise.

15 Claims, 3 Drawing Sheets

U.S. PATENT DOCUMENTS

| | | | |
|---|---|---|---|
| 6,668,970 B1 * | 12/2003 | Lee | 181/224 |
| 6,892,851 B2 * | 5/2005 | Lee | 181/224 |
| 2004/0200664 A1 * | 10/2004 | Monson et al. | 181/224 |

FOREIGN PATENT DOCUMENTS

| | | |
|---|---|---|
| DE | 2254169 | 5/1973 |
| DE | 19730355 C1 | 3/1999 |
| EP | 0667496 A1 | 8/1995 |
| JP | 57012189 | 1/1982 |
| JP | 6272950 | 9/1994 |
| WO | 02/23099 A1 | 3/2002 |
| WO | 2005/030581 A1 | 4/2005 |

\* cited by examiner

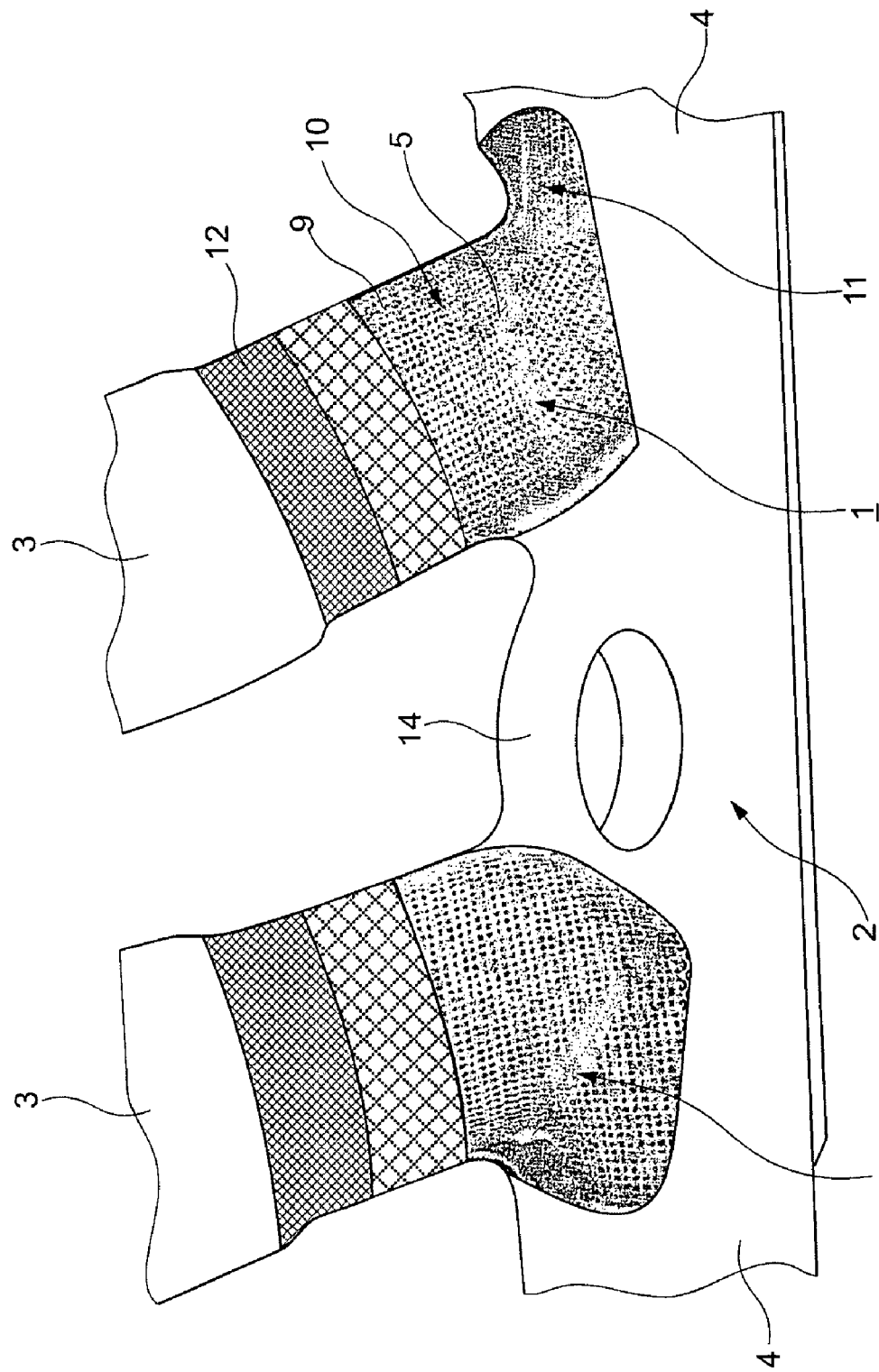

US 7,815,012 B2

NOISE OPTIMIZED AIR DISTRIBUTOR

CROSS-REFERENCE TO RELATED APPLICATION

This application is a continuation of International Application No. PCT/EP2007/003191, filed Apr. 10, 2007, which was published under PCT Article 21(2) and which claims priority to German Patent Application No. 10 2006 018 404.1 filed Apr. 20, 2006 and of U.S. Provisional Patent Application No. 60/745,202 filed Apr. 20, 2006, which all hereby incorporated in their entirety by reference.

TECHNICAL FIELD

The technical field relates to a noise optimized air distributor to avoid the generation of noise when redirecting an air flow, in particular low frequency noise in ventilation systems.

BACKGROUND

In ventilation systems, as they are being used in aircraft, for example, a low frequency high volume noise is generated at joints between air ducts, due to the redirection of the air flow when transitioning from one air duct to another. The air flow velocity in certain air ducts, the so called riser ducts is typically very high. When this airflow is redirected into transversal air ducts, this air flow should be re directed to both sides of the transversal air duct. The distribution in both directions can be different and also 100% in one direction, for example. The turbulences generated at the joint of the air ducts are a significant source of low frequency noise. This noise can actually not be reduced through the use of conventional mufflers. In particular in the cabin of an aircraft with a ventilation system, such noise impairs the comfort of the passengers in the cabin.

In view of the foregoing, there may be a need to provide an air distributor, which avoids the generation of disturbing noise due to the redirection of an air flow, in particular reducing the disturbing noise generated by low frequency noise. In addition, other needs desirable features, and characteristics will become apparent from the subsequent summary and detailed description and the appended claims, taken in conjunction with the accompanying drawings and this background.

SUMMARY

An air distributor according to an embodiment of the invention has a perforated body, which can be inserted at a joint between a first air duct, which extends in a first direction, and a second air duct which extends in a second different direction, for redirecting an air flow in the first air duct into a second air duct, wherein a component of the air flow passes through the perforations provided in the body.

According to an embodiment of the invention, the body has Y-shape, and the base end of the Y-shaped body leads into the first air duct and the two top ends of the y-shaped body lead into the second air duct. Such a Y-shaped body is used preferably to distribute the air flow in both directions of the second air duct.

According to another embodiment of the invention the body has L-shape, and the one arm of the L-shaped body leads into the first air duct, and the other arm of the L-shaped body into the second air duct. Such L-shaped body is preferably used to distribute the air flow mainly in one direction into the second air duct. The perforation also allows redirecting a component into the other direction.

When the body has L-shape, according to an embodiment of the invention, an end of the first air duct is connected to an end of the second air duct, and the air ducts extend in different directions.

According to another embodiment of the invention the body is perforated along its entire surface. Alternatively design advantages can be reached, when the respective initial sections and end sections of the "Y" or "L" body are not perforated, which improves strength.

According to another embodiment of the invention, the body has the shape of the air ducts and is preferably provided tubular or hollow. According to another embodiment the body is plate shaped and inserted into the air ducts.

According an embodiment of the invention the above mentioned air distributor is used in ventilation systems for aircraft. With the above described air distributor it is possible to avoid the generation of low frequency noise, which would otherwise be transmitted into the cabin of the aircraft, which could degrade passenger comfort. The air distributor according to the invention is structurally small and can be easily integrated into existing ventilation systems.

BRIEF DESCRIPTION OF THE DRAWINGS

The present invention will hereinafter be described in conjunction with the following drawing figures, wherein like numerals denote like elements, and FIG. 1 a schematic view of an air distributor according to a first embodiment, installed into a ventilation system;

FIG. 4 a view of an air distributor according to a third embodiment.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
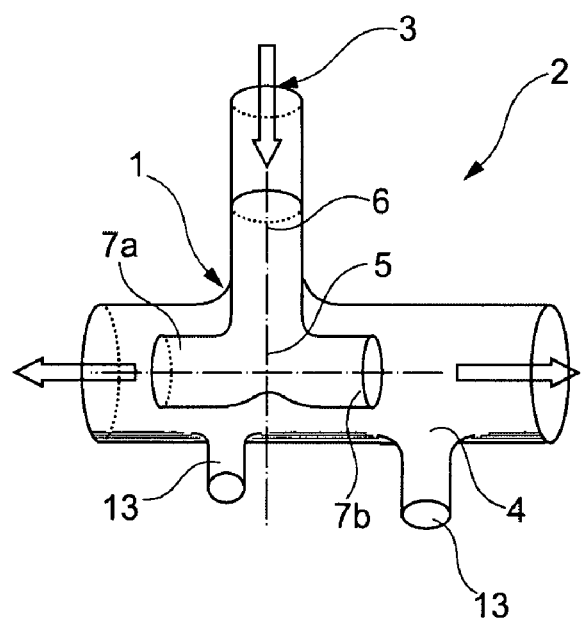

FIG. 1 shows a schematic view of an air distributor 1, which is installed in a ventilation system 2. FIG. 1 shows a cut out of the ventilation system 2 including a first air duct 3 and a second air duct 4. The first air duct 3 (riser) extends substantially perpendicular to the second air duct 4. Typically the flow velocity of an air flow in the first air duct 3 is high. In FIG. 1 the air flow is indicated by the arrow.

As shown in FIG. 1, the air distributor 1 is provided at the joint of the first air duct 3 and the second air duct 4, thus where the first air duct 3 leads into the second air duct 4, and an air flow in the first air duct 3 is redirected into the second air duct 4. The air distributor 1 includes, but is not limited to a body 5 with a plurality of perforations, which are provided as holes, and its envelope surface forms a cavity as shown in FIG. 2.

According to the first preferred embodiment the body 5 of the air distributor 1 is provided Y-shaped. When installed into the ventilation system, a base end 6 of the Y-shaped body 5 leads into the first air duct 3, and the two top ends 7a, b each lead into the second air duct 4. In particular in FIG. 1 the top end 7a of the Y-shaped body 5 leads into the air duct 4 on the left side, and the head end 7b lead into the second air duct 4 on the right side.

FIG. 1 also shows two branch offs 13 in the air duct 4. A direct flow into these branch offs 13 is not favorable acoustically and aerodynamically. According to the air distributor 1 it is avoided, that the branches offs receive a direct flow from the air flow in the air duct 3.

Figure 2:
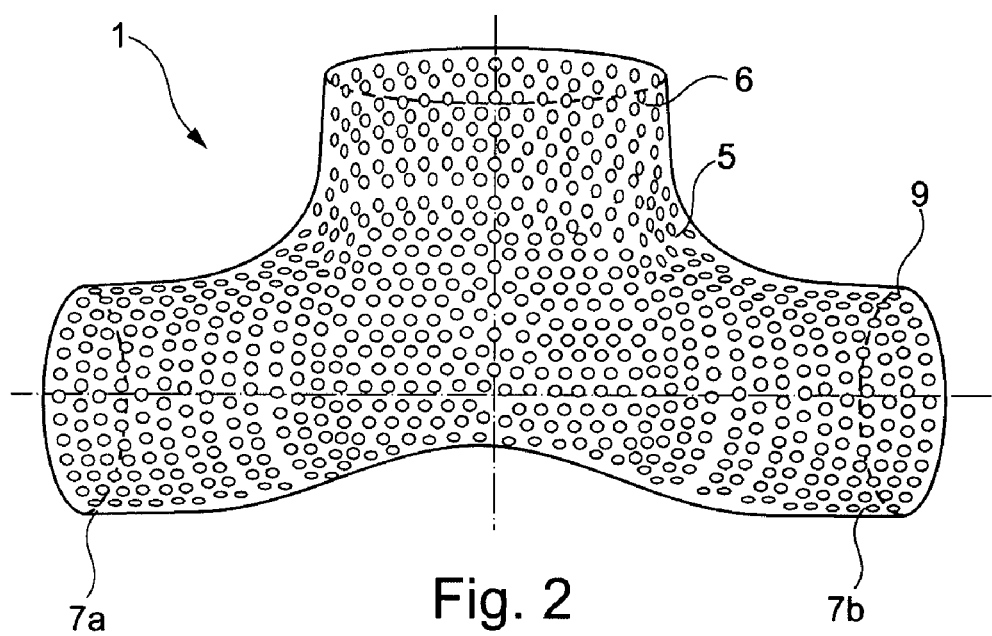
FIG. 2 a more detailed view of the air distributor according to FIG. 1.

As shown in FIG. 2, the body 5 of the air distributor 1 is provided tubular. The base end 6 and the top ends 7a, b are mounted to the air ducts 3, 4 in a suitable manner. The base end 6 of the body 5 of the air distributor 1 e.g. in the area of the air duct 3 is connected to it through adhesive tape. The body 5 of the air distributor 1 can be made from plastic or metal or another suitable material.

When a main airflow flows through the first air duct 3, as indicated by the arrows in FIG. 1, it is redirected to the left and to the right at the joint 8 of the first air duct 3 and the second air duct 4. The airflow thereby flows through the body 5 and through the perforations 9 provided in the body 5, as shown in FIG. 2. According to the first preferred embodiment, the entire body 5 is provided with perforations 9, thus with pass-through holes, so that an airflow can flow through the perforations 9.

When the airflow flows through the perforations, only small vortices are generated, which do not induce low frequency noise. These small vortices induce high frequency noise, which can easily be reduced through conventional mufflers when required.

Figure 3:
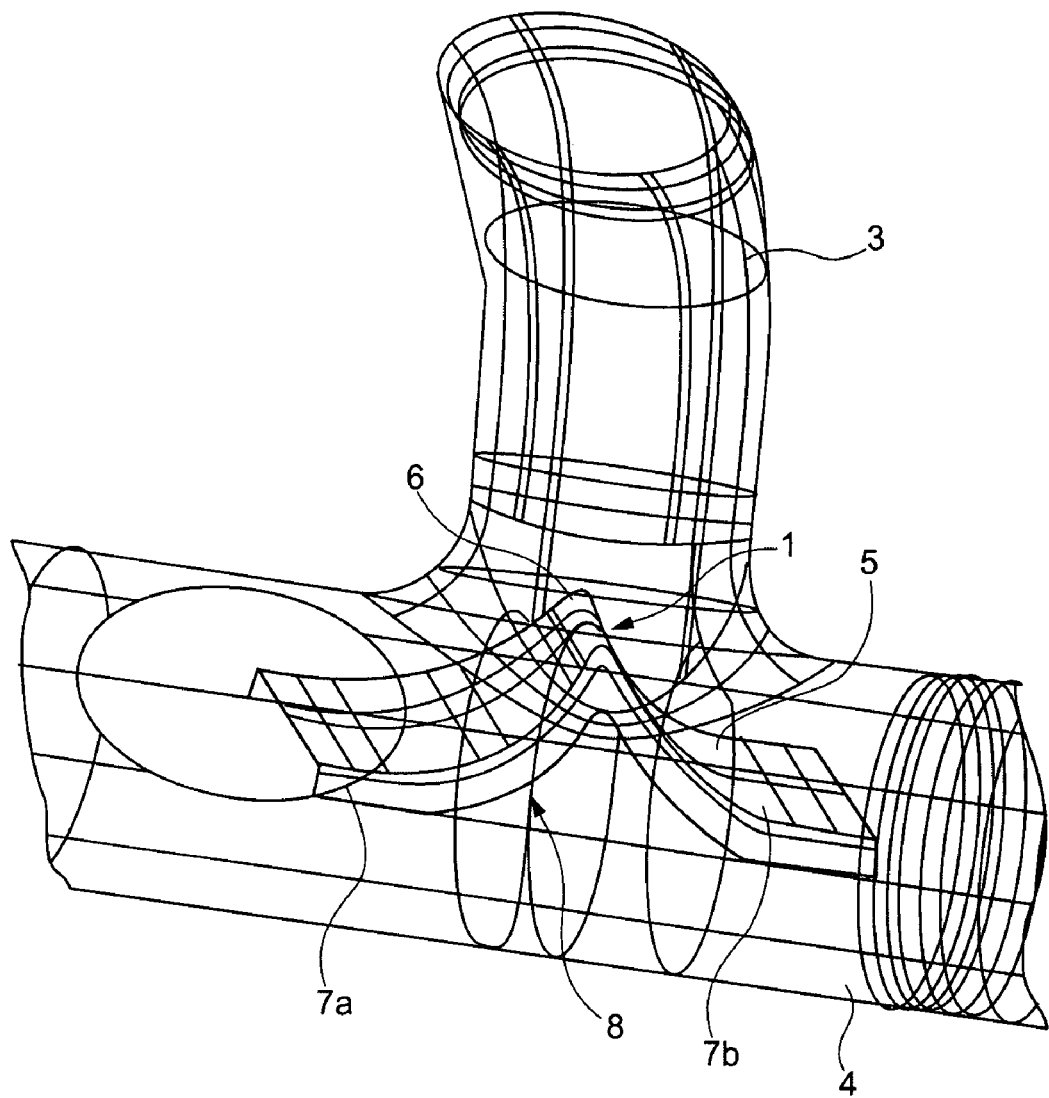
FIG. 3 a view of an air distributor according to a second embodiment, which is installed into a ventilation system.

FIG. 3 shows an air distributor 1 according to a second preferred embodiment of the invention. The air distributor according to the second embodiment differs from the one according to the first embodiment through the body 5 being plate shaped. The body 5 has Y-shape or V-shape, wherein the base end 6 of the Y-shaped body 5 in its installed position points in the direction of the first air duct 3, and the two top ends 7a and 7b of the Y-shaped body 5 extend to the left and to the right partially into the second air duct 4. Though not shown in the figure, the body 5 of the air distributor 1 has perforations (pass-through holes) on its entire surface, so that an airflow flowing through the air duct 3 impacting upon the base end 6 of the body 5 and upon surface areas of the top ends 7a, b of the body 5, is deflected in the figure to the left and to the right, into the second air duct 4, and partially passes through the perforations 9 in the body 5. Through this passing through the perforations 9, the generation of low frequency high volume noise, which is generated through large vortices, is avoided, similar to the first embodiment, since only small vortices are created through the perforations 9.

Similar to the first preferred embodiment, the body 5 is made from metal, plastic, or another suitable material, and can be made e.g. from one piece or from several pieces, so that e.g. the top ends 7a, b can each be bent at one end, and the respective bent ends can be connected with each other through welding, for example, in order to form the base end 6 of the body 5.

Similar to the first embodiment, the body 5 of the air distributor 1, according to the second embodiment can be mounted in a suitable manner in the first or second respective air duct through gluing or clamping, for example.

FIG. 4 shows two air distributors 1 according to a third preferred embodiment of the invention. The air distributor 1 according to the third embodiment differs from the air distributors according to the first and second embodiment only through the form of the body 5 being L-shaped. As shown in FIG. 4, an arm 10 of the body 5 is connected to the first air duct 3, and a second arm 11 of the body 5 is connected to the second air duct 4.

As shown in FIG. 4, the arm 10 of the body 5 of the air distributor 1 can be mounted to the first air duct 3 with an adhesive tape 12, so that an airflow passing through the first air duct 3 impacts upon the air distributor 1 and is deflected through it into the second air duct 4. During the deflection a component of the airflow exits through the perforations 9 of the body 5, generating small vortices, so that low frequency noise is reduced. Therefore, according to the air distributor 1 of the third embodiment, the same effects are being obtained, as according to the first and second embodiment.

FIG. 4 also shows a connector 14 in the middle, which is mostly supplied with air flowing through the perforations, avoiding large vortices (low frequency noise in the area of the connector). The perforated shape of the body 5 also allows a transversal flow in the air duct 4. The airflows in the air duct 3 e.g. amount to 50 l/s each. When e.g. 10 l/s are to be distributed to the right, and 10 l/s are to be distributed through the connector 14 in the middle, 30 l/s have to flow to the left into the air duct 4. The perforated design of the air distributor 1 facilitates this accomplishment.

Though the invention has been described in the above with reference to the preferred embodiments, it is appreciated that modifications and changes can be performed without departing from the scope of the invention. For example the body 5 according to the air distributor 1 according the third embodiment is shown as being provided tubular. Alternatively it is possible, similar to the embodiment according to FIG. 3, to provide the body 5 as plate shaped. Furthermore, only a fraction of the surface of the body 5 can be perforated, e.g. at a critical location, where an airflow impacts upon the air distributor 1. Furthermore, the use of the air distributor according to the invention in aircraft was described in the above. It is appreciated, that the air distributor according an embodiment of the invention can also be used in other ventilation systems in other areas of application besides aviation, in which the task has to be solved to redirect high velocity airflow into another air duct, which causes low frequency noise, which is difficult to dampen with conventional dampers.

Additionally, it should be pointed out that "comprising" does not exclude other elements or steps and "a" does not exclude a plurality. Furthermore, it should be pointed out that features or steps, which have been described with reference to one of the above embodiments, can also be used in combination with other features or steps of other embodiments described above.

Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An air distributor, comprising:
    a first air duct extending in a first direction;
    a second air duct extending in a second direction;
    a joint between the first air duct and the second air duct;
    a body adapted for insertion at the joint and adapted to deflect an airflow in the first air duct into the second air duct;

a plurality of perforations in the body adapted to pass a component of the airflow, the plurality of perforations located in an area of the body where the airflow initially impacts upon the air distributor, the plurality of perforations being configured such that the component of the airflow passing through the plurality of perforations generates small vortices thereby reducing low frequency noise generated by the airflow exiting from the first duct;

a base end of the body that points into the first direction when in an installed position; and a first top end and a second top end of the body adapted to extend partially into the second air duct.

2. The air distributor according to claim 1, wherein the plurality of perforations is located on at least a fraction of a surface of the body.

3. The air distributor according to one of the claim 1, wherein the body has a shape of at least one of the first air duct or the second air duct.

4. The air distributor according to claim 1, wherein the body is a tubular shape body.

5. The air distributor according to claim 1, wherein the body is a plate shaped body.

6. The air distributor according to claim 1, wherein the tubular body is a Y-shaped body.

7. The air distributor according to claim 1, wherein the tubular body is a V-shaped body.

8. An air distributor, comprising:

a first air duct extending in a first direction;

a second air duct extending in a second direction, substantially perpendicular to the first direction;

a joint between the first air duct and the second air duct;

a body adapted for insertion at the joint and adapted to obliquely deflect an airflow exiting from the first air duct into the second air duct at an initial airflow impact area;

a plurality of perforations in the body adapted to pass a component of the airflow, the plurality of perforations located in the initial airflow impact area;

a base end of the body that points into the first direction when in an installed position; and a first top end and a second top end of the body adapted to extend partially into the second air duct.

9. The air distributor of claim 8, wherein the plurality of perforations is configured such that at least the component of the airflow passing through the plurality of perforations generates vortices that induce high frequency noise.

10. The air distributor according to claim 9, wherein the plurality of perforations is located on at least a fraction of a surface of the body.

11. The air distributor according to one of the claim 9, wherein the body has a shape of at least one of the first air duct or the second air duct.

12. The air distributor according to claim 9, wherein the body is a tubular shape body.

13. The air distributor according to claim 9, wherein the body is a plate shaped body.

14. The air distributor according to claim 12, wherein the tubular body is a Y-shaped body.

15. The air distributor according to claim 12, wherein the tubular body is a V-shaped body.

* * * * *